(12) United States Patent
Luo

(10) Patent No.: US 8,553,259 B2
(45) Date of Patent: Oct. 8, 2013

(54) INTELLIGENT PRINT OPTIONS FOR SEARCH ENGINE RESULTS

(75) Inventor: Guiluan Luo, Pleasanton, CA (US)

(73) Assignee: Ricoh Company, Ltd, Tokyo (JP)

( * ) Notice: Subject to any disclaimer, the term of this patent is extended or adjusted under 35 U.S.C. 154(b) by 738 days.

(21) Appl. No.: 12/729,791

(22) Filed: Mar. 23, 2010

(65) Prior Publication Data

US 2011/0235088 A1    Sep. 29, 2011

(51) Int. Cl.
   G06F 3/12      (2006.01)
   G06F 17/30     (2006.01)

(52) U.S. Cl.
   USPC ............... 358/1.15; 707/E17.108; 707/706

(58) Field of Classification Search
   USPC ........ 358/1.15; 707/E17.108, 706; 715/764, 715/760
   See application file for complete search history.

(56) References Cited

U.S. PATENT DOCUMENTS 7,200,820 B1 *  4/2007  Stephens ................... 715/838
8,274,687 B2 *  9/2012  Ohba et al. ................ 358/1.15

FOREIGN PATENT DOCUMENTS

JP    2005322113 A  * 11/2005
JP    2008077656 A  *  4/2008

* cited by examiner

*Primary Examiner* — Thomas D Lee
(74) *Attorney, Agent, or Firm* — Duft Bornsen & Fettig, LLP

(57) ABSTRACT

Systems and methods presented herein provide for intelligent print options to a user selecting web content of search results provided by a search engine. For example, the user may choose to perform a search through a search engine by entering search criteria within a webpage of the search engine. The search engine may return the search results to the user's web browser via the search engine's webpage. Along with these results, print options may be provided to the user on the webpage. By selecting to automatically print one or more of the search results, the content of the selected result(s) may be converted to a printable format such that page numbers may be counted and returned to the user. Based on the number of pages, the user may make a more informed decision as to whether the user should print the content.

20 Claims, 13 Drawing Sheets

INTELLIGENT PRINT OPTIONS FOR SEARCH ENGINE RESULTS

BACKGROUND

1. Field of the Invention

The invention relates generally to providing print options for search engine results.

2. Discussion of Related Art

A search engine operates by "web crawling" and indexing various websites on the Internet and then searching for those websites when directed. In doing so, search engines store information about many web pages, which they retrieve from the html itself. These webpages are retrieved by via web crawling, which is an automated process of following every link on a website. The contents of each webpage are then analyzed to determine how they should be indexed. Data about the web pages is then stored in an index database for use in later queries by a user.

Indexing allows information to be found as quickly as possible. Some search engines, such as Google, store all or part of the source page (referred to as a cache) as well as information about the web pages. The cached page generally retains the actual search text since it can be useful when the contents of a current page have been updated in a way that the search terms no longer exist. When a user enters a query into a search engine (typically using "key words"), the search engine examines its index and provides a listing of the best-matching web pages according to its criteria, usually with a short summary containing the document's title and sometimes parts of the text.

The usefulness of a search engine depends on the relevance of the results it gives back. While there may be millions of web pages that include a particular word or phrase, some pages may be more relevant, popular, or authoritative than others. Most search engines employ methods to rank the results to provide the "best" results first. How a search engine decides which pages are the best matches and what order the results should be shown in, varies widely from one engine to another.

In most cases, the search engine presents a user with Internet search results in a list. The results may include links to web pages, images, documents, and other types of data. The contents may also be distributed over several pages that are traversed via links in the current search results page. Generally, the sizes of contents of these links are unknown. Accordingly, the user is not given enough information to decide whether or not to print a certain link without actually displaying the webpage(s) of a website. In this regard, a user may not wish to print a certain webpage without at least first reviewing the contents thereof (e.g., because a webpage may include hundreds of pages that the user does not wish to print).

SUMMARY

The systems and methods presented herein provide intelligent print options to a user selecting web content of search results provided by a search engine. For example, a user may choose to perform a search through a search engine by entering search criteria within a webpage of the search engine. The search engine may return the search results to the user's web browser via the search engine's webpage. Along with these results, print options may be provided to the user on the webpage. By selecting to automatically print one or more of the search results, the content of the selected result(s) may be converted to a printable format such that the page numbers may be counted and returned to the user. Based on the number of pages, the user may make a more informed decision as to whether the user should print the content.

In one embodiment, a method of providing print options for printing of web content includes retrieving a list of websites from a search engine, processing a print request to print a website selected from the retrieved list of websites, and retrieving one or more webpages associated with the selected website to convert content of the one or more webpages to a page printable format (e.g., Portable Document Format (PDF)). The method also includes determining a number of pages of the converted content and providing a user interface that includes the number of pages and an option to print at least a portion of the pages to a user.

The method may further include presenting the list of websites with a web browser of a multifunction printer or an Internet web browser operable within a client device. Processing the print request for the selected website may include transferring a Uniform Resource Locator (URL) of the selected website a web server or a search engine. In this regard, the method further includes converting the content of the one or more webpages to the page printable format at the web server/search engine. The method may further include receiving verification of the print request based on the option to print at least a portion of the converted website content, retrieving the pages from the web server, and printing the pages on a printing device.

In another embodiment, one or more computer readable mediums store instructions that, when executed by a processor, direct the processor to retrieve a list of websites from a search engine, process a print request to print a website selected from the retrieved list of websites, and retrieve one or more webpages associated with the selected website to convert content of the one or more webpages to a page printable format. The one or more computer readable mediums may also store instructions that direct the processor to determine a number of pages of the converted content and provide a user interface that includes the number of pages and an option to print at least a portion of the pages to a user.

In another embodiment, a web server includes a processor and a network interface. The processor is operable to direct the network interface to receive a search request and retrieve a list of websites from a search engine based on the search request. The processor is also operable to process a print request to print a website selected from the retrieved list of websites, direct the network interface to retrieve one or more webpages associated with the selected website, convert content of the one or more webpages to a page printable format. In this regard, the processor is also operable to determine a number of pages of the converted content and generate a user interface that includes the number of pages and an option to print at least a portion of the pages.

BRIEF DESCRIPTION OF THE DRAWINGS

The same reference number represents the same element or same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
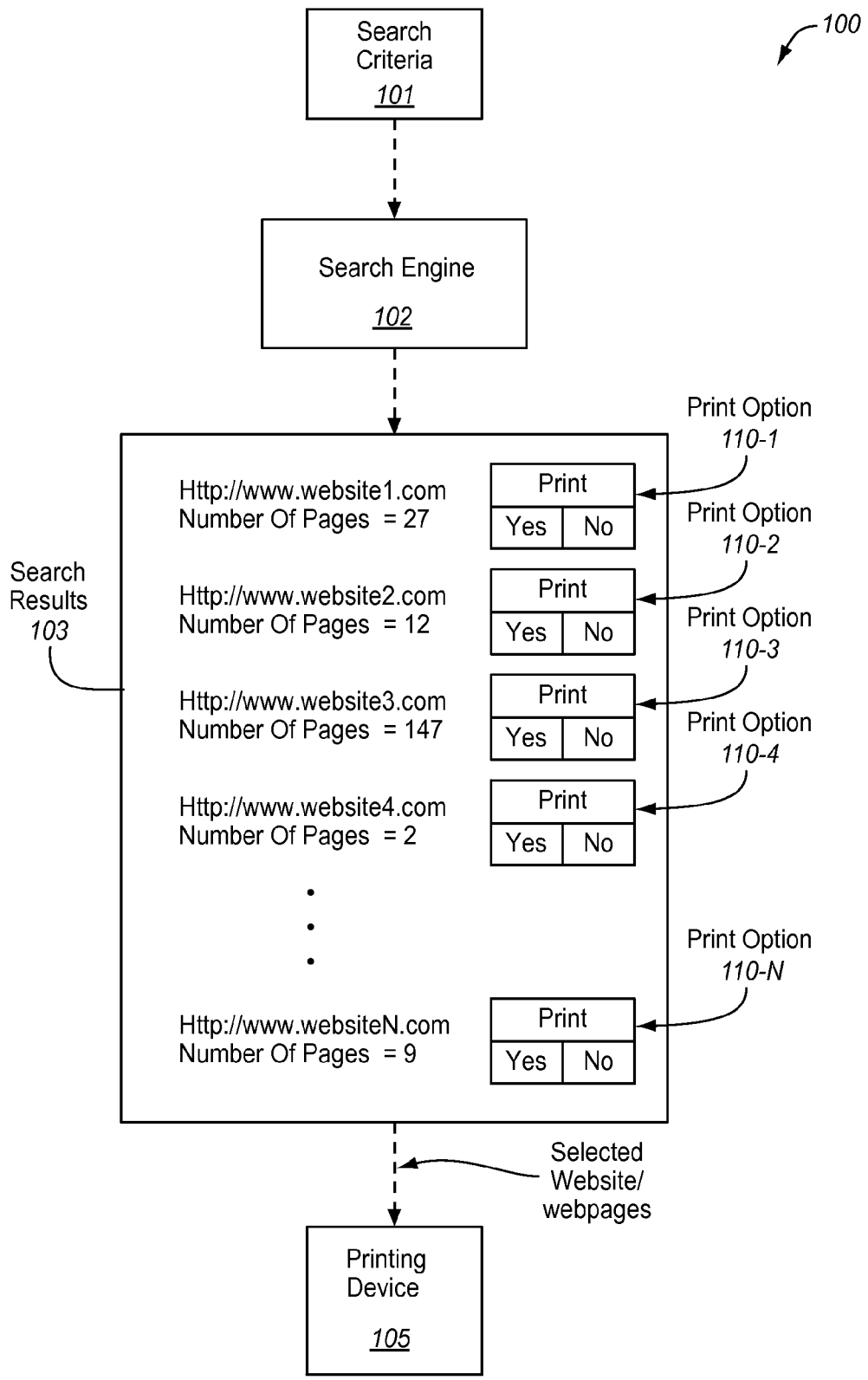
FIG. 1 is a block diagram of an exemplary print option system.

FIG. 1 is a block diagram of an exemplary print option system 100. The print option system 100 includes a search engine 102 and a printing device 105. The search engine 102 comprises any system operable to receive search criteria 101 and retrieve search results 103 from the Internet or another data network (e.g., an intranet or a private data network). As used herein, the term data network collectively refers to each of these types of data communication. Generally, the search engine 102 is configured from a variety of hardware and software components (e.g., Internet web servers and software modules operating therewith). The search engine 102 may be operable to receive the search criteria 101 through the data network by means of a webpage accessible to users through the data network. For example, the search engine 102 may have a webpage through which users submit their search criteria 101, such as keywords. Once the search criteria 101 are received by the search engine 102, the search engine 102 may identify and return the search results 103. Examples of such include the websites of Google, Yahoo, and Microsoft Bing. Other examples include search fields within a news website such as Time, Newsweek, and the New York Times where a user may include search terms to locate certain published articles.

The printing device 105 of the print option system 100 includes any device or printing system operable to print a print job (e.g., a printer, a network enabled copier, a multifunction device, a remote printing service, etc.) by transferring print data of the print job to a printable medium (e.g., paper) via ink, toner, or the like. The operational details of providing print options via the print option 100 system are now shown and described with respect to FIG. 2.

Figure 2:
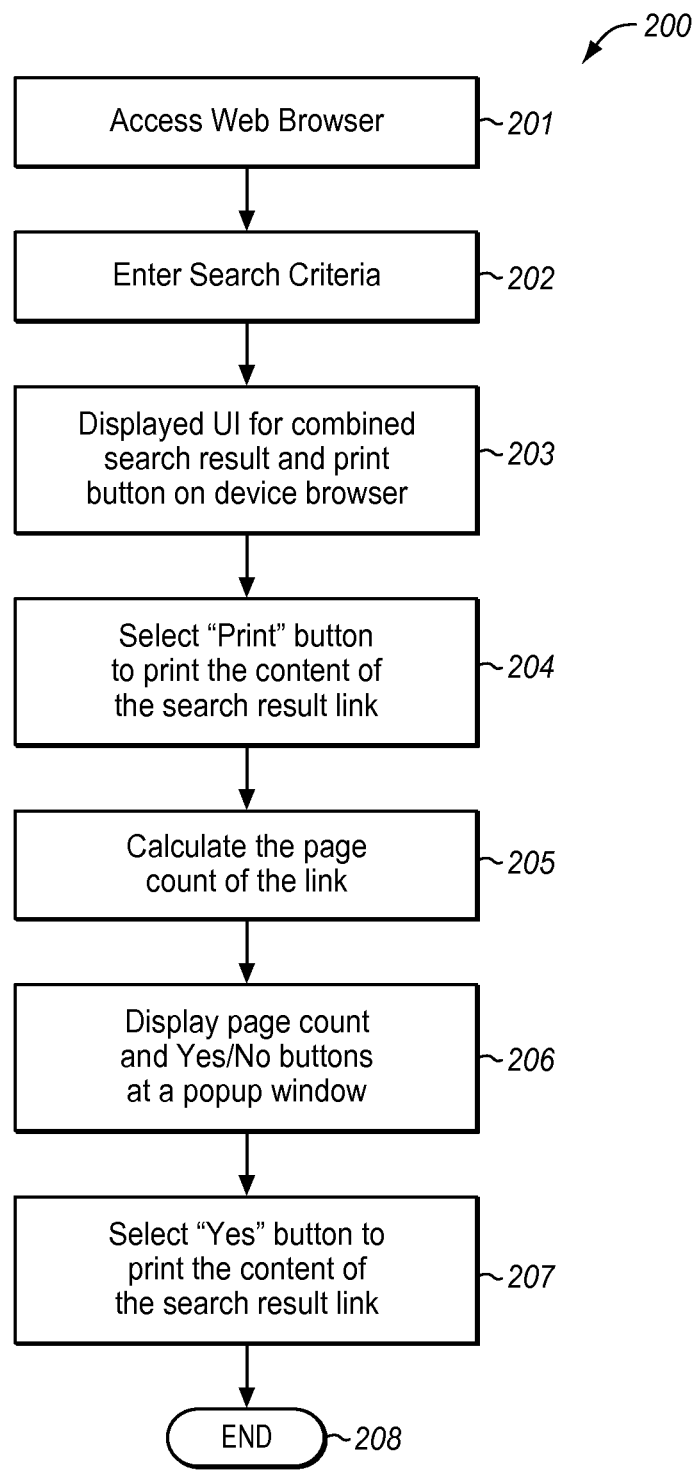
FIG. 2 is a flow chart illustrating an exemplary process of providing print options.

FIG. 2 is a flow chart illustrating an exemplary process 200 of providing print options 110-1 . . . N (where N represents an integer greater than or equal to 1 without being necessarily equal to any other N used herein). The process 200 initiates when a user accesses a web browser or other communication means, in the process element 201, to interact with the search engine 102 and enter the search criteria 101 therewith, in the process element 202. The search engine 102 in turn provides the search results 103 as links to websites a user may access via a user interface, in the process element 203. For example, the search engine 102 may provide the search results to the web browser operating within the user's client device and being viewed within a display of the client device. In this regard, the client device may be any device capable of receiving information from the search engine and displaying that information for the user. Examples of such client devices include computers, smart phones, network enabled multifunction printers, and the like.

Being displayed with the search results 103 are the print options 110-1 . . . N. Each print option 110 is presented as a user interface "button" that the user may select to request printing of a particular website and pages contained therein without actually viewing the content of the website. The print options 110 may be configured in a variety of ways as a matter of design choice. For example, the print options 110 may be configured as an applet within a web browser of the client's device that automatically loads when the search results 103 are returned to the client's web browser by the search engine 102. Other exemplary embodiments are shown are described throughout FIGS. 3-10.

With the print options 110-1 . . . N being displayed for the user, the user may select one or more of the print options 110 to print the contents of the search result link in the process element 204. Once selected, the print option system 100 calculates the number of pages of the website link being printed in the process on the 205. For example, assuming that the user wishes to print the website link http://www.website2.com within the search results 103 without actually viewing the content of that website within the user's web browser, the user selects the print button configured alongside that particular search result. The selection directs the computation of the number of printable pages for that website via the web browser, a web server, or the search engine itself. The resulting page count is then displayed alongside the search results 103 such that the user may reconsider printing based on the page count of the website, in the process element 206. In this example, the number of pages computed for the website link http://www.website2.com is 12 pages. Should this be an acceptable number of pages for the user to print, the user may select the yes button in the print option 110-2, in the process element 207. Otherwise, the user selects the no button of the print option 110-2 to cancel printing. In any case, the process 200 ends in the process element 208 (although the process 200 may resume when the user initiates another search request of the search engine 102 or selects another website to print).

Figure 3:
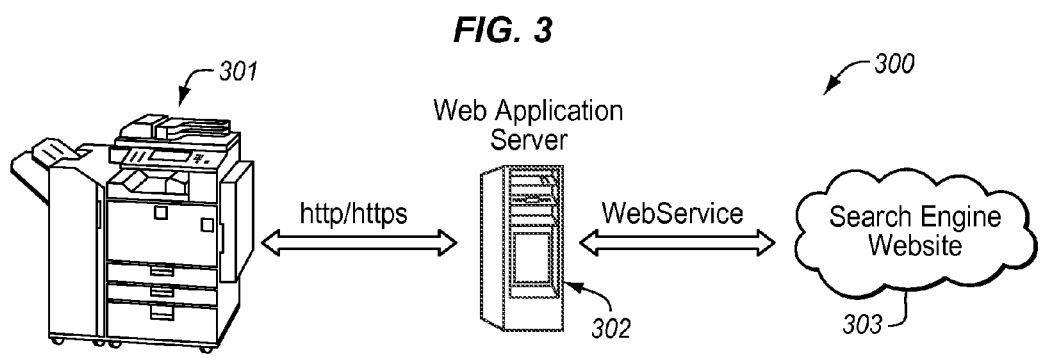
FIG. 3 is a block diagram of an exemplary print option system operable with a multifunction printer interacting with a search engine through a web server.

As mentioned, the invention may be implemented in a variety of ways, examples of which are shown and described in FIGS. 3-10. In FIG. 3 a block diagram of another exemplary print option system 300 is shown with its operational aspects described as a process 400 is the flowchart of FIG. 4. This intelligent print option system 300 days operable with a multifunction printer 301 interacting with a search engine website 303 through a web server 302. For example, a multifunction printer 301 may communicate to the search engine 102 through the search engine's website 303. In doing so, the multifunction printer 301 may be communicatively coupled to the web server 302 via an http or an https connection depending on the type of data network. The web server 302, in turn, communicatively couples the multifunction printer 301 to the search engine 302 through the search engine's website 303.

Figure 4:
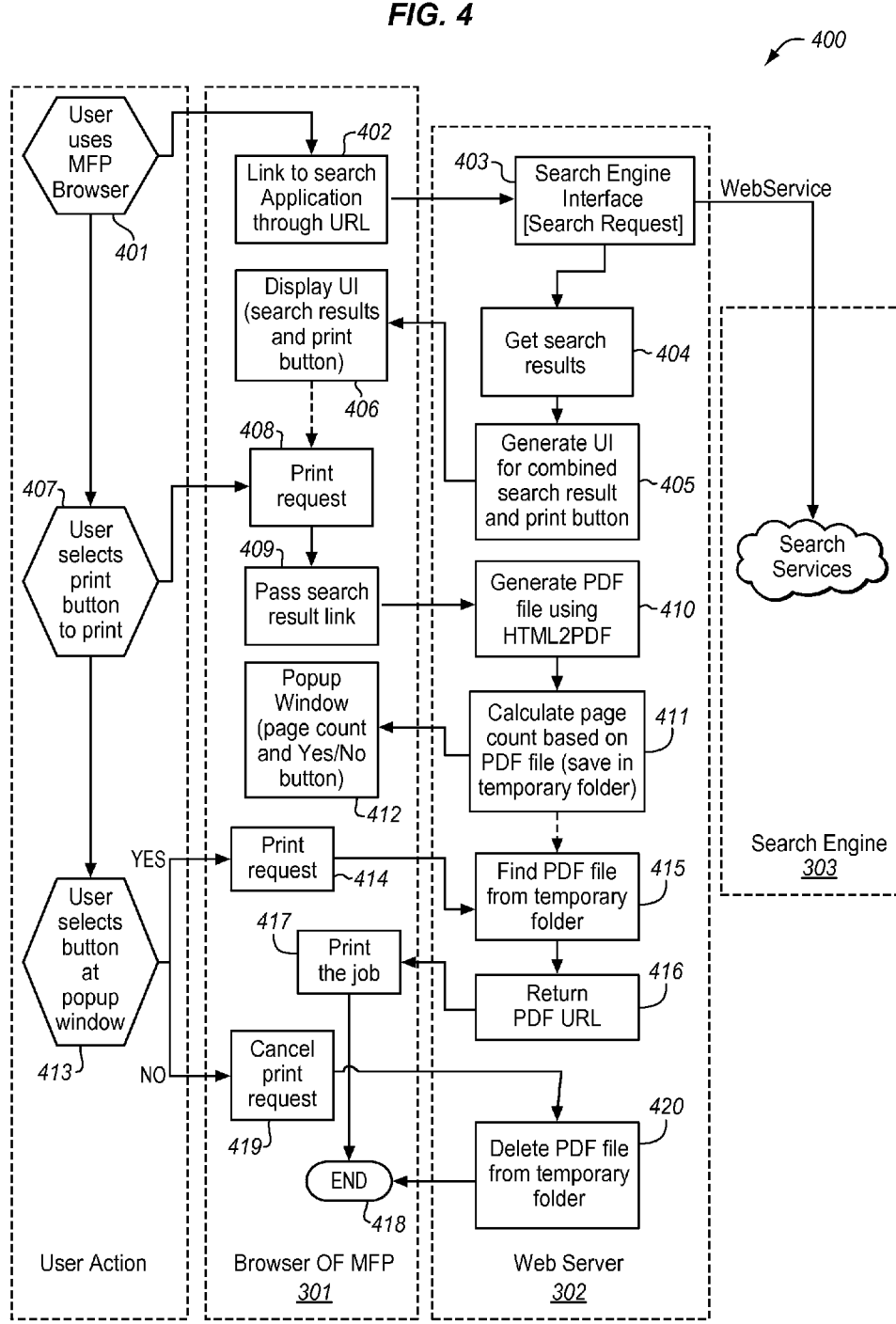
FIG. 4 is a flow chart illustrating the print option system of FIG. 3.

As shown in FIG. 4, the process 400 initiates when a user accesses a web browser within the multifunction printer 301. As known to those skilled in the art, certain multifunction printers are capable of connecting to the Internet and even displaying information therefrom via a web browser. In this regard, the user accesses the browser within the multifunction printer 301, in the process element 401. The user then links to a search application through a URL, in the process element 402. For example, the user may type in the website address of a known search engine, such as Google.com, Yahoo.com, Bing.com, or the like. The web browser of the multifunction printer 301 then communicates to the web server 302 thereby interfacing with the search engine 102, in the process element 403. In doing so, the web server 302 may transfer the search criteria 101 of the user to the search engine 102 to obtain the results of that search, in the process element 404. The web server 302 may then generate a user interface that combines the search results with the print options 110, in the process element 405. The web server 302 transfers that user interface to the browser of the multifunction printer 301, in the process element 306, for viewing by the user.

Upon viewing the search results 103, the user may select one or more print buttons in the associated print option 110, in the process element 407, to initiate a print request, in the process element 408. Once requested, the browser of the multifunction printer 301 transfers the search result link (i.e., the website of the search result 103) to the web server 302, in the process element 409. The web server 302 then generates a PDF file or other printable file format of the website of the search result link, in the process element 410. In this embodiment, the web server 302 is illustrated using an exemplary HTML2PDF program to convert the webpages to the PDF format. With the webpages converted to the PDF file, the number of pages may then be calculated from the file, in the process element 411. The PDF file may then be retained by the web server 302 in a temporary folder or other storage until the process 400 completes.

The web server 302 transfers the page count to the browser of the multifunction printer 301 as a "pop up window" that illustrates the total number of pages of the PDF file along with the yes/no option buttons, in the process element 412. From there, the user may select one of the buttons to initiate printing (yes) or forgo printing (no) in the process element 413. If the yes button is selected, the browser of the multifunction printer 301 generates a print request, in the process element 414, and transfers that print request to the web server 302. The web server 302, in turn, locates the PDF file from the temporary folder, in the process element 415, and returns a URL of the PDF, in the process element 416, to the browser of the multifunction printer 301. The multifunction printer 301 then uses the URL to generate a print job and print the PDF file in the process element 417. The process 400 then ends, in the process element 418, until the user makes another search request and/or print request. If the user selects the no button, a cancellation of the print request is generated, in the process element 419, and transferred to the web server 302 such that the web server 302 may delete the PDF file from the temporary folder, in the process element 420, thereby ending the process 400 in the process element 418.

Figure 5:
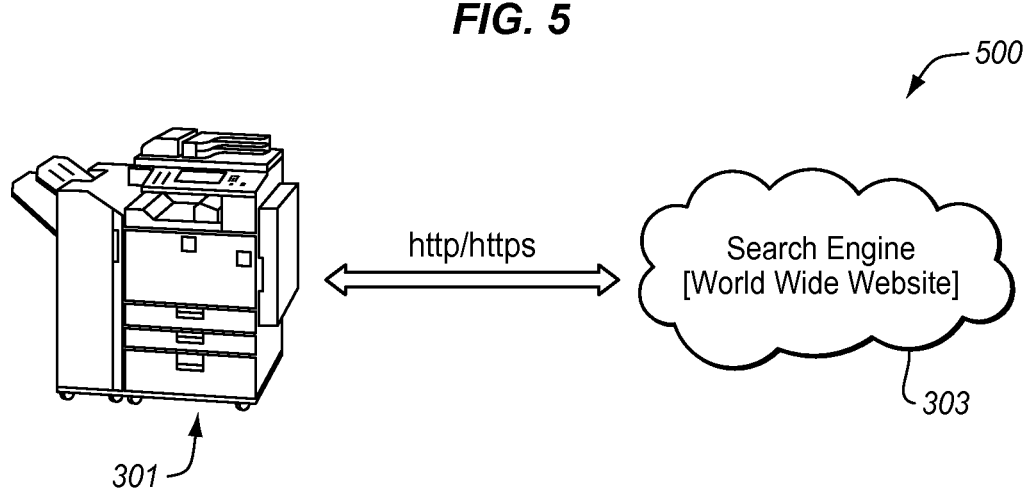
FIG. 5 is a block diagram of an exemplary print option system operable with a multifunction printer directly interacting with a search engine.
Figure 6:
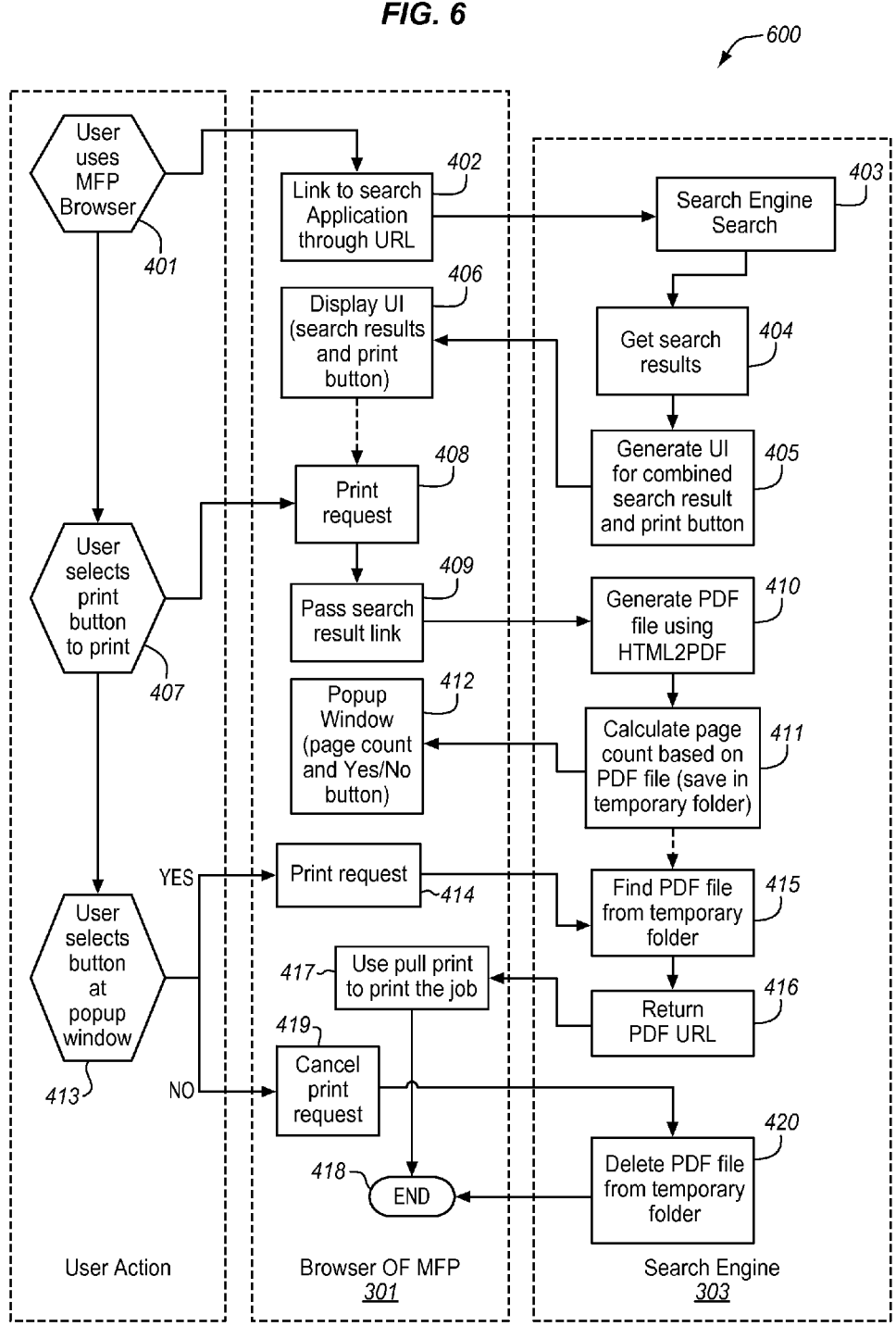
FIG. 6 is a flow chart illustrating the print option system of FIG. 5.

FIG. 5 is a block diagram of an exemplary print option system 500 operable with the multifunction printer 301 directly interacting with the search engine 102 via the search engine website 303. For example, a multifunction printer 301 may have a direct http/https Internet connection to the search engine 102. One example of such may be a search engine operable within a private data network that the multifunction printer 301 directly accesses to retrieve private search results for data within the private data network. Another example may include having the multifunction printer 301 directly accessing an Internet search engine. In any case, the search engine 102 is configured with the print option capabilities as opposed to being configured with the web server 302 as illustrated in FIG. 3. In this regard, the operational details of the print option system 500 are similar in nature to the process 400 of FIG. 4, with the primary difference between the two processes 400 and 600 being the operation of the process elements 403, 404, 405 410, 411, 415, 416, and 420 within the search engine 102.

Figure 7:
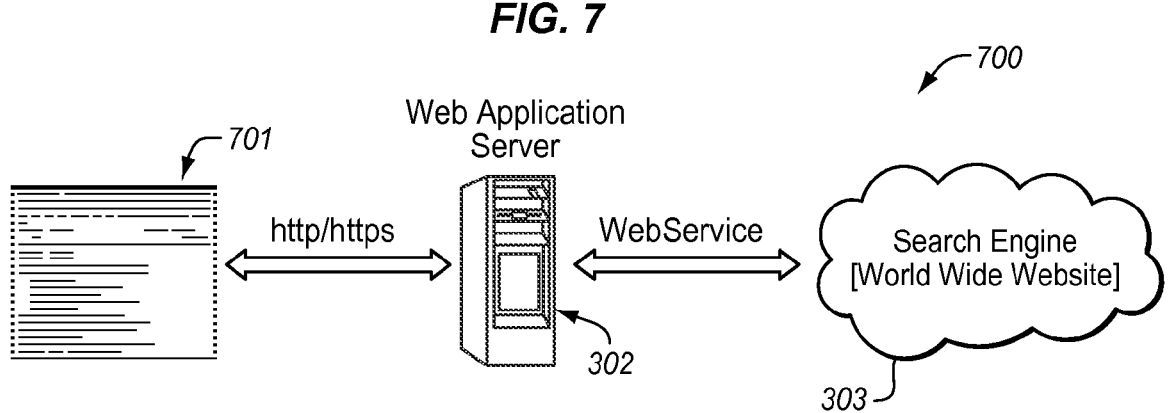
FIG. 7 is a block diagram of an exemplary print option system operable with a web browser interacting with a search engine through a web server.
Figure 8:
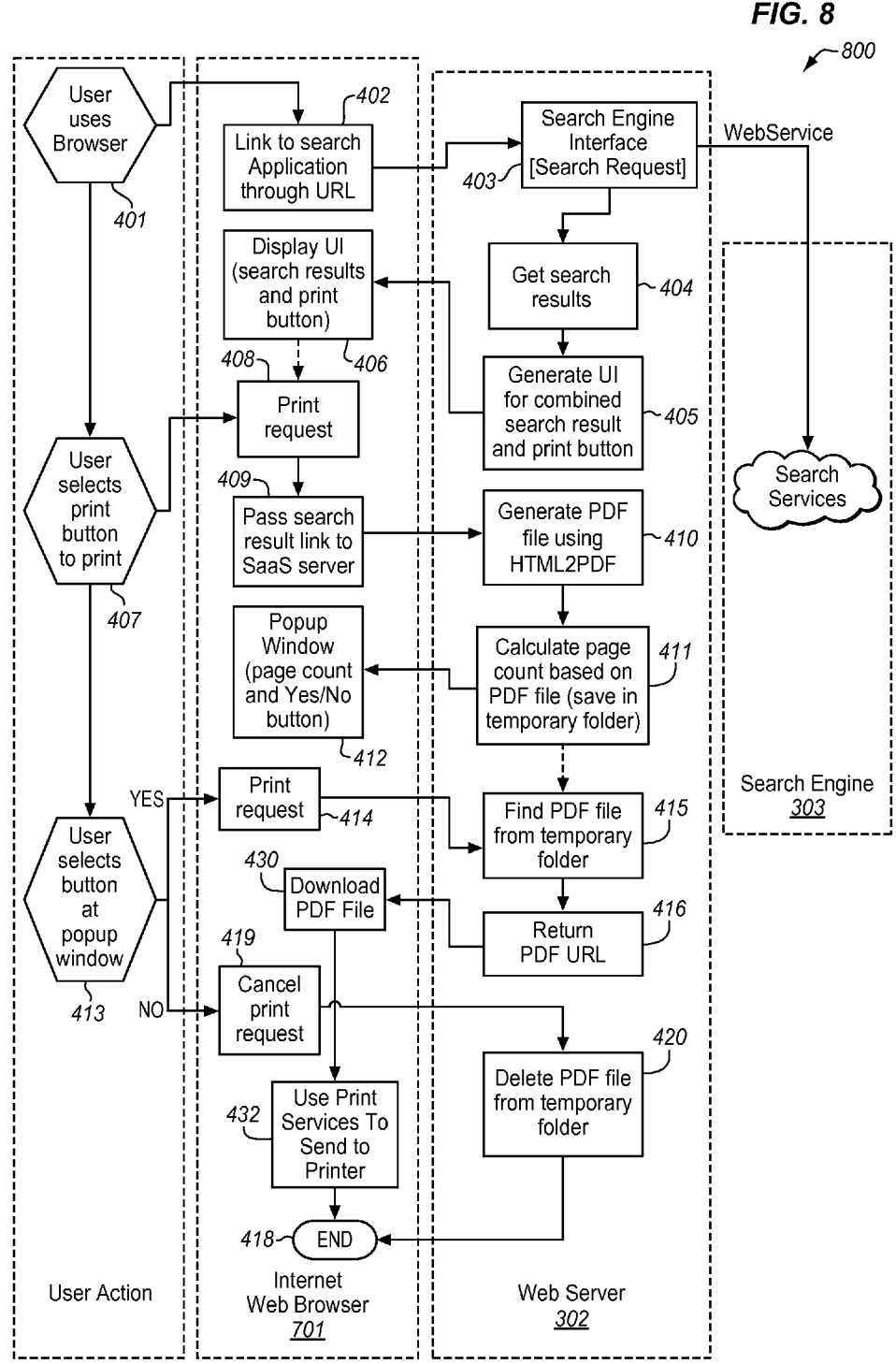
FIG. 8 is a flow chart illustrating the print option system of FIG. 7.

FIG. 7 is a block diagram of another exemplary print option system 700 operable with a web browser 701 interacting with the search engine 102 through the web server 302. The operational details of this intelligent print option system 700 are provided with the process 800 in the flowchart of FIG. 8. Generally, the process 800 is operationally the same as the process 600 with the primary difference being operation of the process elements 402, 406, 408, 409, 412, 414, 419, and 418 within the Internet web browser 701. In this regard, these process elements may be configured as an applet or other software module that is operational within the confines of the web browser 701 and the operating system of the particular device displaying the web browser 701, in the process element 401. For example, a client device such as a computer, smart phone, or the like may be configured with a display module that is used to display the web browser 701 and connect a client device to the Internet. The web browser 701 may, in this regard, contact the search engine 102 through the web server 302 and retrieve the search results 103 as previously discussed. Unlike the web browser of the multifunction printer 301, the Internet web browser 701 is not configured with print capabilities. Accordingly, the web browser 701 may download the PDF file to the client device, in the process element 430, from the returned URL (process element 416). The web browser 701 may use various print services to generate a print job and send to a printer configured externally thereto for printing, in the process element 432. For example, the web browser 701 may transfer the PDF file to a printer operating within the data network of the client device. This transfer may occur in a variety ways including direct data connections to the printer, network connections to the printer, remote printing services, etc. . . .

Figure 9:
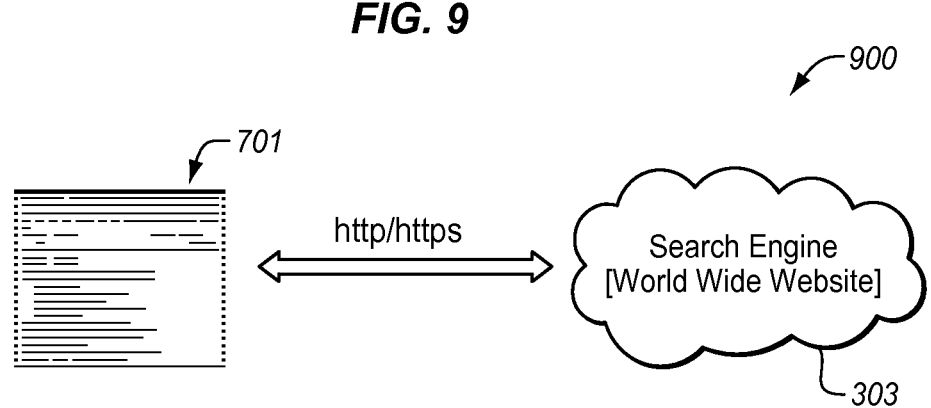
FIG. 9 is a block diagram of an exemplary print option system operable with a web browser directly interacting with a search engine.
Figure 10:
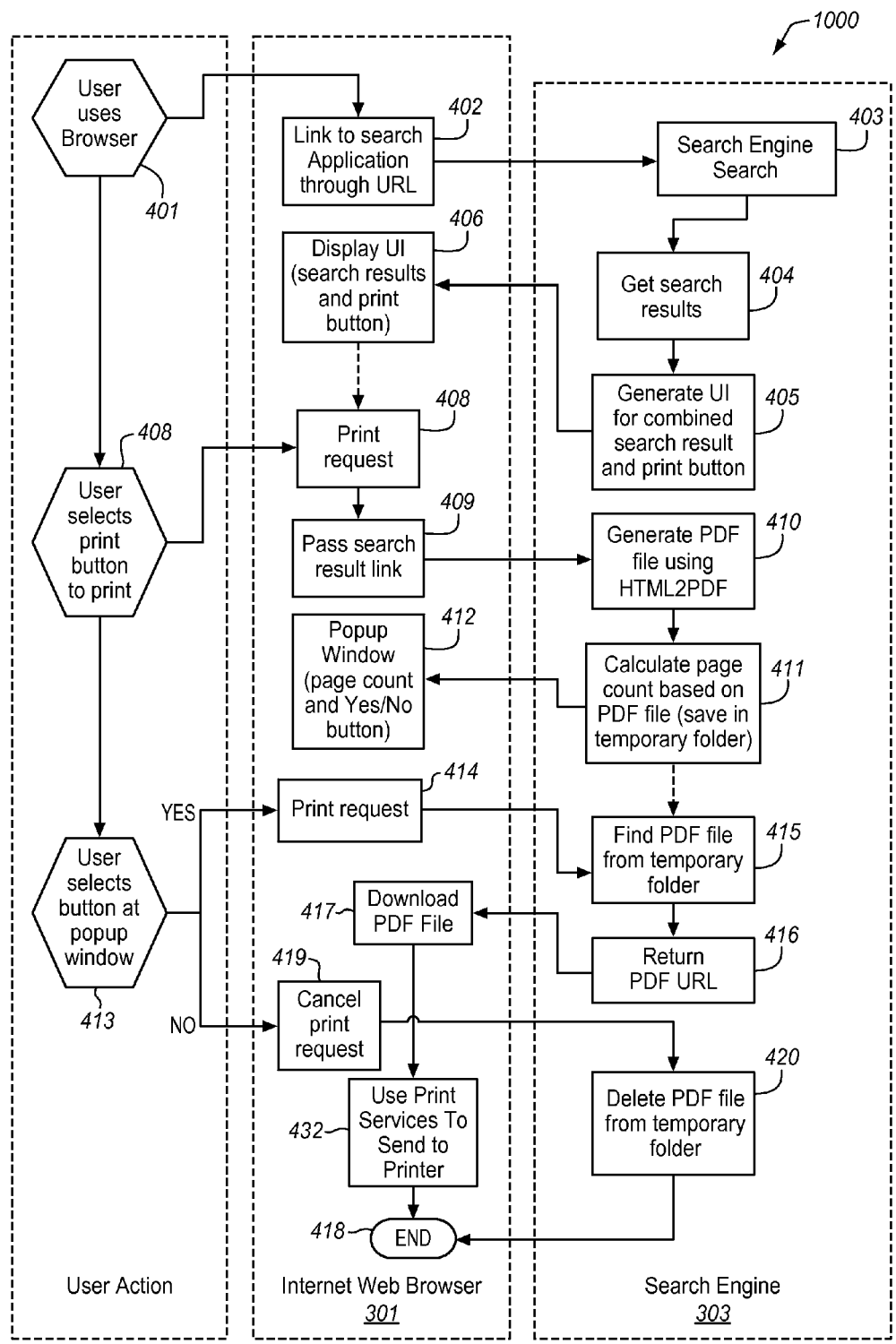
FIG. 10 is a flow chart illustrating the print option system of FIG. 9.

FIG. 9 is a block diagram of yet another exemplary print option system 900 operable with the web browser 701 in the process element 401 directly interacting with the search engine 303. The operational details of the production system 900 are provided in the process 1000 of FIG. 10 and are essentially the same as those performed in the process 800 of FIG. 8. The primary difference between the processes 800 and 1000 again is the operation of the process elements 403, 404, 405, 410, 411, 415, 416, and 420 within the search engine 102.

Figure 11A:
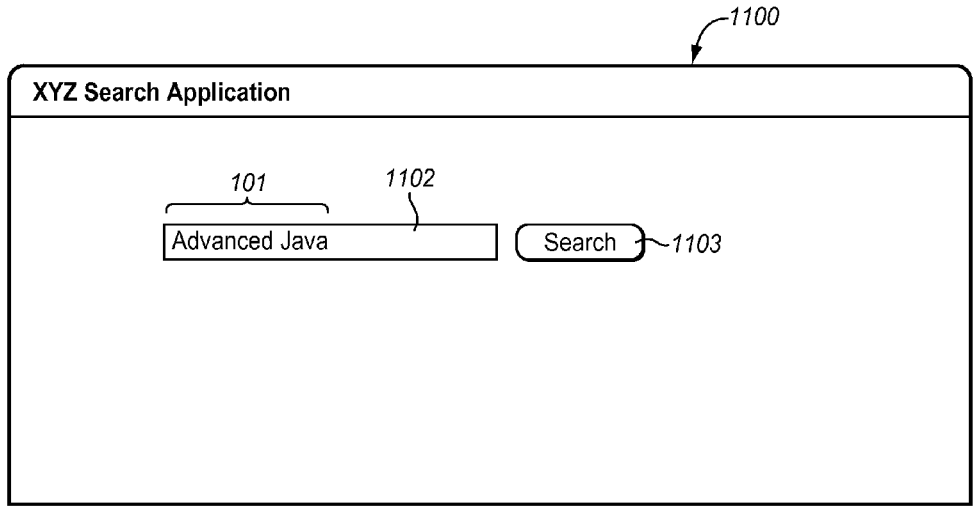
FIGS. 11A-C illustrate an exemplary user interface operable with the print option system.
Figure 11B:
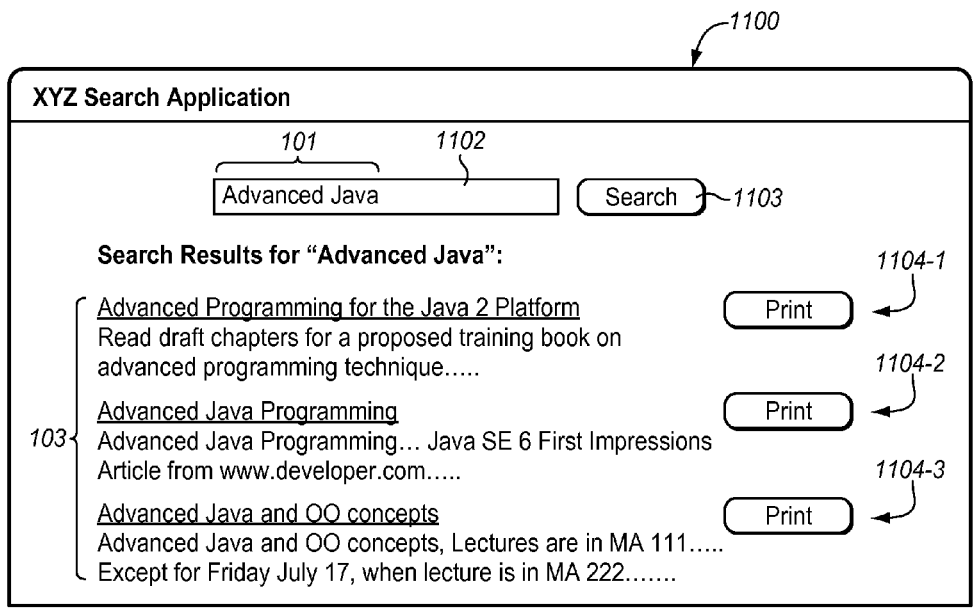
Figure 11C:
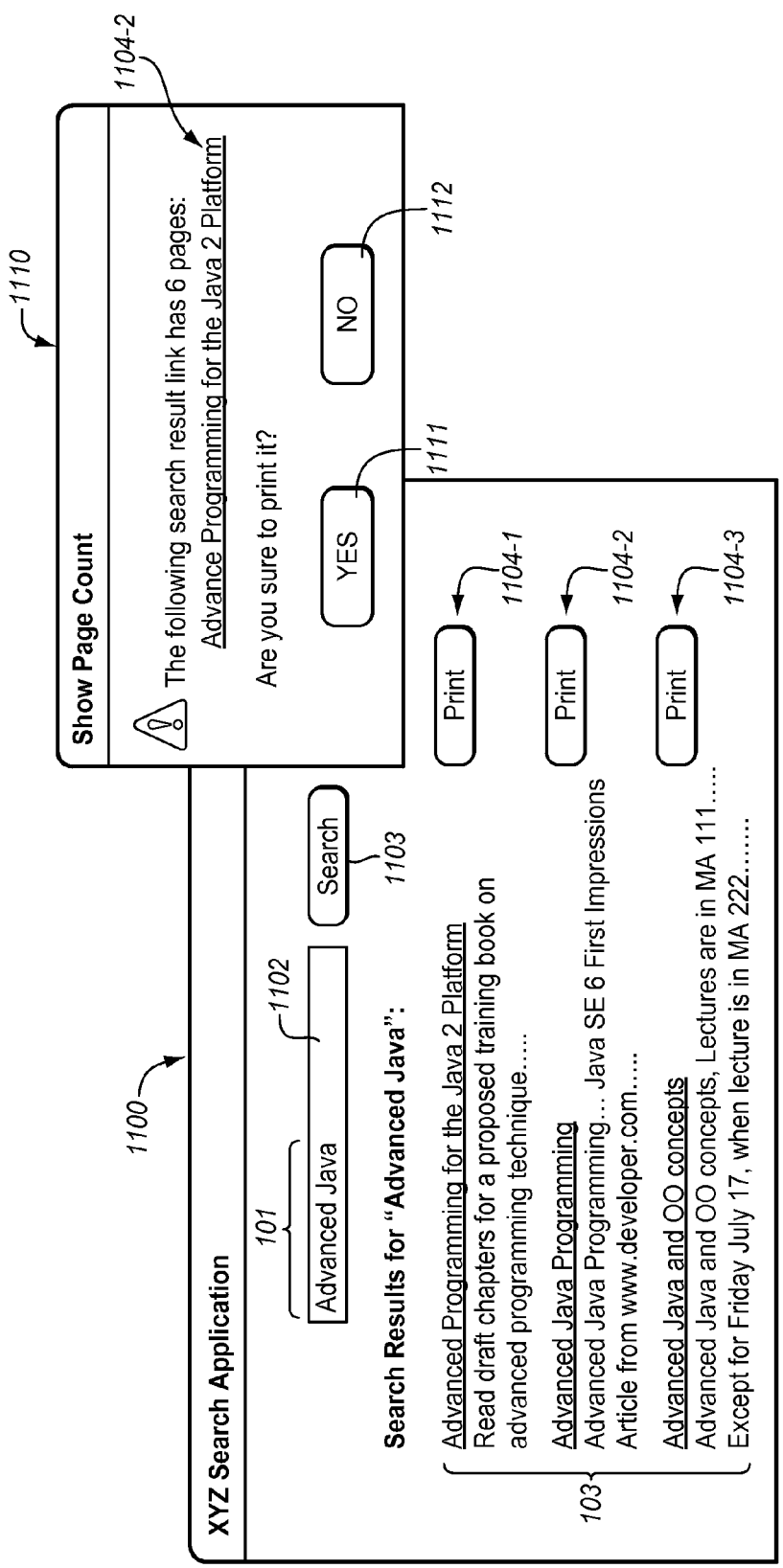

FIGS. 11A-C illustrate an exemplary user interface 1100 operable with any of the print option systems described above. For example, the print option system 100 may display the user interface 1100 as illustrated in FIG. 11A to a user via a web browser. The user in this regard may enter the search criteria 101 in the search entry field 1102 and initiate the search by virtually depressing a search button 1103. In this example, the user has entered the term "advanced Java" to initiate a search for such a topic via the search engine 102. The search engine 102 in turn generates the search results 103 based on the search criteria 101 and displays them in the user interface 1100 as illustrated in FIG. 11B along with a print selection button 1104 for each individual search result. The user selects one or more of the print buttons 1104-1 ... N to initiate printing of the desired search result(s) 103. In this example, the user has selected a search result entitled "Advanced Programming for Java 2 Platform" for printing by virtually depressing the print button 1104-1. This print requests initiates the retrieval of the data associated with that website such that it may be converted to a printable format (e.g., PDF) and its pages counted as described above. Once counted, a pop up window 1110 may be provided to the user's web browser (e.g., via the user interface 1100). This pop up window 1110 identifies the number of pages that would be printed if the user decided to print the webpages of the website. In this example, the website "Advanced Programming for Java 2 Platform" is illustrated as six printable pages. In this regard, the user may decide whether or not to print the website based on the number of pages contained therein. If the user chooses to print the pages, the user may virtually depress the yes button 1111 to generate a print job and print the pages. If not, the user may virtually depress the no button 1112 and cancel printing of the website data.

Figure 12:
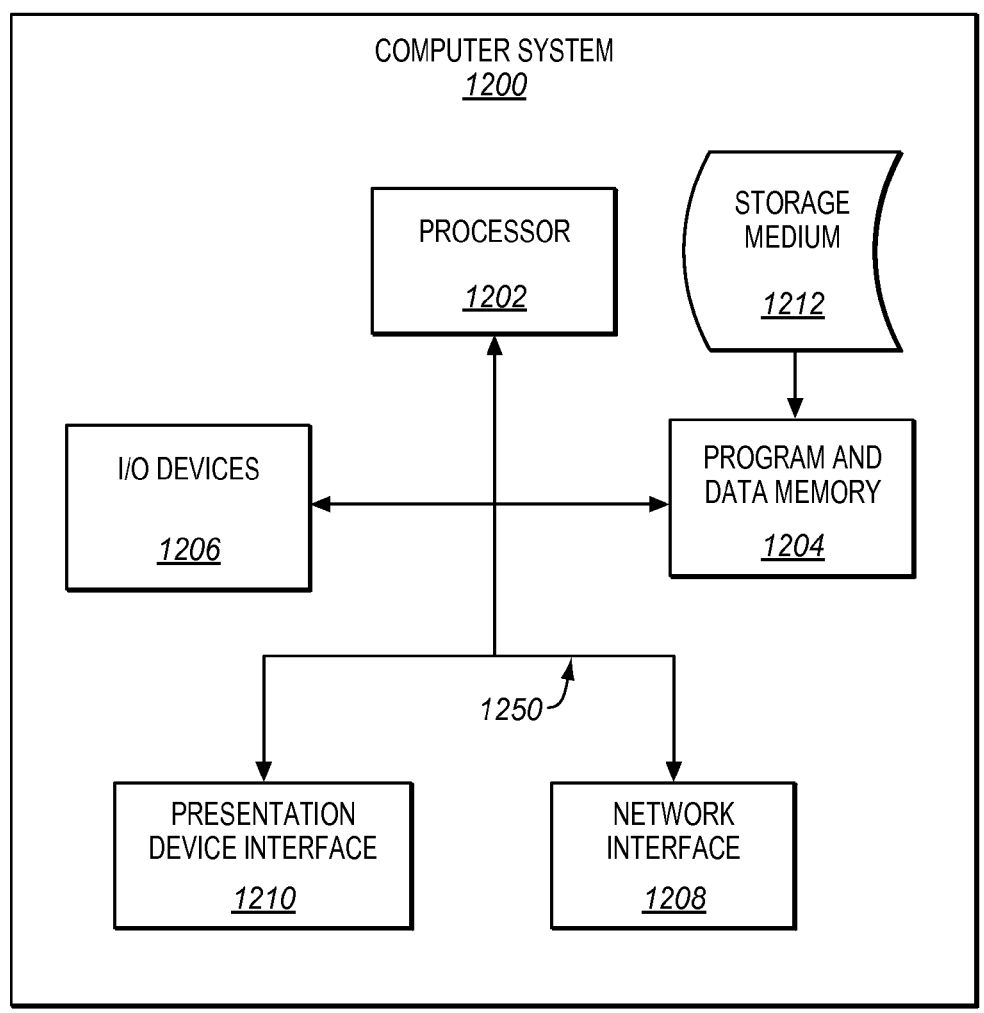
FIG. 12 is a block diagram of an exemplary computing device for executing programmed instructions to carry out the print options various features and aspects.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 12 is a block diagram depicting a computer system 1200 operable to provide features and aspects hereof by executing programmed instructions and accessing data stored on a computer readable storage medium 1212.

Furthermore, embodiments of the invention can take the form of a computer program accessible via a computer-readable medium 1212 providing program code for use by a computer or any other instruction execution system. For the purposes of this description, a computer readable medium 1212 can be any apparatus that can contain, store, communicate, or transport the program code for use by the computer other instruction execution system. The computer readable medium 1212 can be an electronic, magnetic, optical, electromagnetic, infrared, or semiconductor (or apparatus or device). Examples of the computer readable medium 1212 include solid state memory, magnetic tape, a removable computer diskette, a random access memory (RAM), a read-only memory (ROM), a rigid magnetic disk, and an optical disk. Examples of optical disks include compact disk-read only memory (CD-ROM), compact disk-read/write (CD-R/W), and DVD.

The computer system 1200, being suitable for storing and/or executing the program code, includes at least one processor 1202 coupled to memory elements 1204 through a system bus 1250. The memory elements 1204 can include local memory employed during actual execution of the program code, bulk storage, and cache memories that provide temporary storage of at least some program code and/or data in order to reduce the number of times the code and/or data are retrieved from bulk storage during execution.

Input/output I/O devices 1206 (including but not limited to keyboards, displays, pointing devices, etc) can be coupled to the system either directly or through intervening I/O controllers. Network adapter interfaces 1208 may also be coupled to the system to enable the computer system 1200 to become coupled to other data processing systems or storage devices through intervening private or public networks. Modems, IBM Channel attachments, SCSI, Fibre Channel, and Ethernet cards are just a few of the currently available types of network adapter interfaces. Presentation device interface 1210 may be coupled to the system to interface to one or more presentation devices, such as printing systems and displays, for presentation of data generated by processor 1202.

Although specific embodiments have been described herein, the scope of the invention is not limited to those specific embodiments. Accordingly, the scope of the invention is only defined by the following claims and any equivalents thereof.

What is claimed is:

1. A method of providing print options for printing of web content, the method comprising:
   retrieving a list of websites from a search engine;
   processing a print request to print a website selected from the retrieved list of websites;
   retrieving one or more webpages associated with the selected website to convert content of the one or more webpages to a page printable format;
   determining a number of pages of the converted content; and
   providing a user interface that includes the number of pages and an option to print at least a portion of the pages to a user.

2. The method of claim 1, further comprising presenting the list of websites with a web browser of a multifunction printer.

3. The method of claim 1, further comprising presenting the list of websites with an Internet web browser operable within a client device.

4. The method of claim 1, further comprising converting the pages to a Portable Document Format (PDF).

5. The method of claim 1, wherein processing a print request for the selected website comprises transferring a Uniform Resource Locator (URL) of the selected website a web server, wherein the method further comprises converting the content of the one or more webpages to the page printable format at the web server.

6. The method of claim 5, further comprising:
   receiving verification of the print request based on the option to print at least a portion of the converted website content;
   retrieving the pages from the web server; and
   printing the pages on a printing device.

7. The method of claim 1, wherein processing a print request for the selected website comprises transferring a Uniform Resource Locator (URL) of the selected website to the search engine, wherein the method further comprises converting the content of the one or more webpages to the page portable format at the search engine.

8. The method of claim 7, further comprising:
   receiving verification of the print request based on the option to print at least a portion of the pages of the converted website content;
   retrieving the pages from the search engine; and
   printing the pages on a printing device.

9. One or more non-transitory computer readable mediums comprising instructions that, when executed by a processor, direct the processor to:
   retrieve a list of websites from a search engine;
   process a print request to print a website selected from the retrieved list of websites;
   retrieve one or more webpages associated with the selected website to convert content of the one or more webpages to a page printable format;
   determine a number of pages of the converted content; and provide a user interface that includes the number of pages and an option to print at least a portion of the pages to a user.

10. The computer readable medium of claim 9, wherein the instructions further direct the processor to present the list of websites with a web browser of a multifunction printer.

11. The computer readable medium of claim 9, wherein the instructions further direct the processor to present the list of websites with an Internet web browser operable within a client device.

12. The computer readable medium of claim 9, wherein the instructions further direct the processor to convert the pages to a Portable Document Format (PDF).

13. The computer readable medium of claim 9, wherein, in processing a print request for the selected website, the instructions further direct the processor to transfer a Uniform Resource Locator (URL) of the selected website a web server, wherein the instructions further direct the processor to convert the content of the one or more webpages to the page printable format at the web server.

14. The computer readable medium of claim 13, wherein the instructions further direct the processor to:
receive verification of the print request based on the option to print at least a portion of the converted website content;
receive the pages from the web server; and
print the pages on a printing device.

15. The computer readable medium of claim 9, wherein, in processing a print request for the selected website, the instructions further direct the processor to transfer a Uniform Resource Locator (URL) of the selected website a search engine, wherein the instructions further direct the processor to convert the content of the one or more webpages to the page printable format at the search engine.

16. The computer readable medium of claim 15, wherein the instructions further direct the processor to:
receive verification of the print request based on the option to print at least a portion of the pages of the converted website content;
receive the pages from the search engine; and
print the pages on a printing device.

17. A web server, comprising:
a processor; and
a network interface;
wherein the processor is operable to direct the network interface to receive a search request and retrieve a list of websites from a search engine based on the search request; and
wherein the processor is further operable to process a print request to print a website selected from the retrieved list of websites, direct the network interface to retrieve one or more webpages associated with the selected website, convert content of the one or more webpages to a page printable format, determine a number of pages of the converted content, and generate a user interface that includes the number of pages and an option to print at least a portion of the pages.

18. The web server of claim 17, wherein the processor is further operable to retrieve the selected website using a Uniform Resource Locator (URL) and convert the content of the one or more webpages to the page printable format.

19. The web server of claim 17, wherein the processor is further operable to convert the pages to a Portable Document Format (PDF), receive verification of the print request based on the option to print at least a portion of the converted website content, direct the network interface to transfer the converted pages to a printer for printing.

20. The web server of claim 17, further comprising a storage element operable to store the converted content of the one or more webpages, wherein the processor is further operable to delete the converted content of the one or more webpages in response to receiving a print cancellation.

* * * * *